June 22, 1965     D. E. HOLT ETAL     3,190,456
SHIPBOARD CARGO TRANSFERRING APPARATUS
Filed July 11, 1963     12 Sheets-Sheet 5
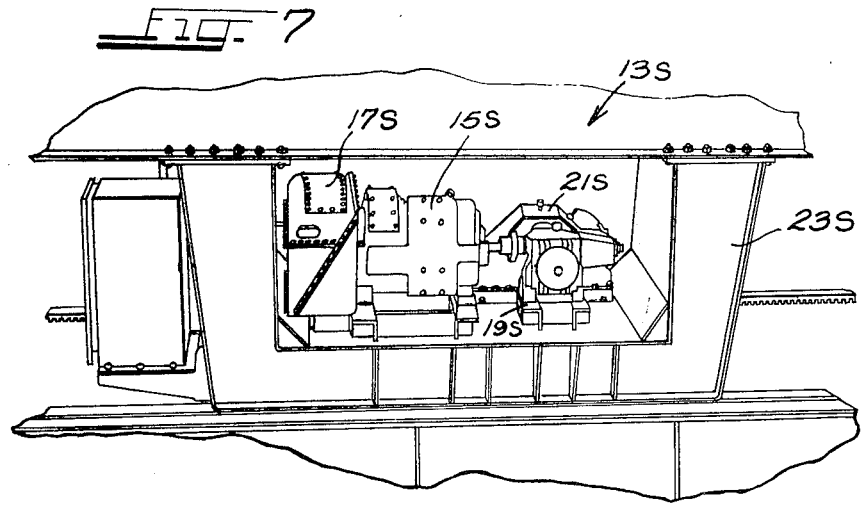
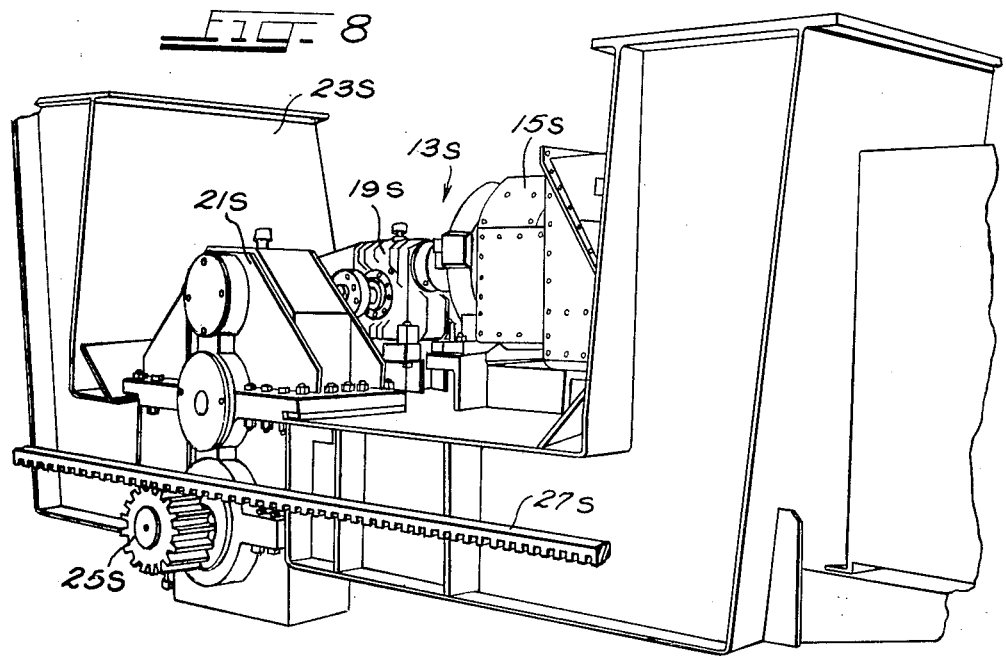
INVENTOR.
DOUGLAS E. HOLT
ALEXANDER V. KORE
MAX DECHANTSREITER
BY

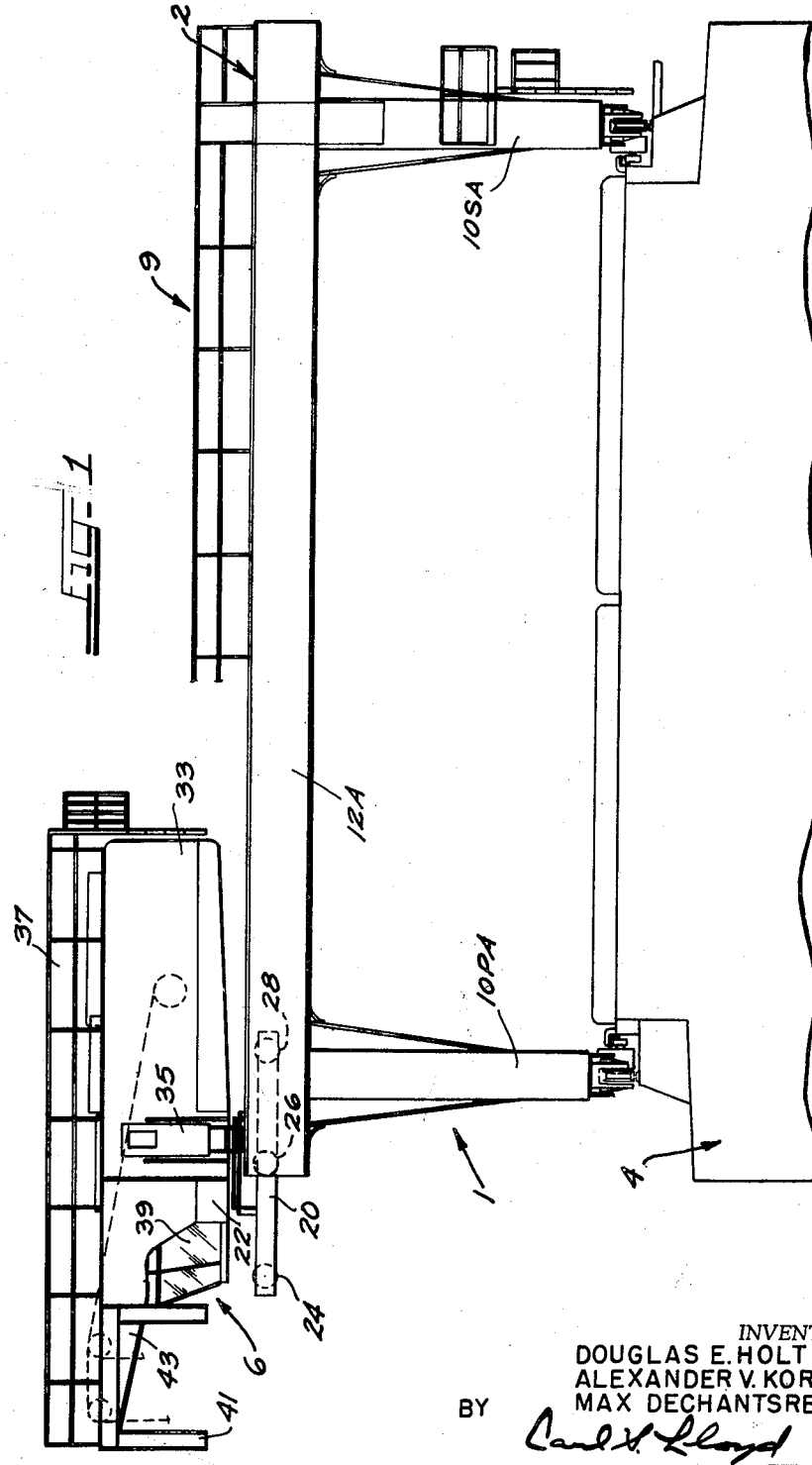

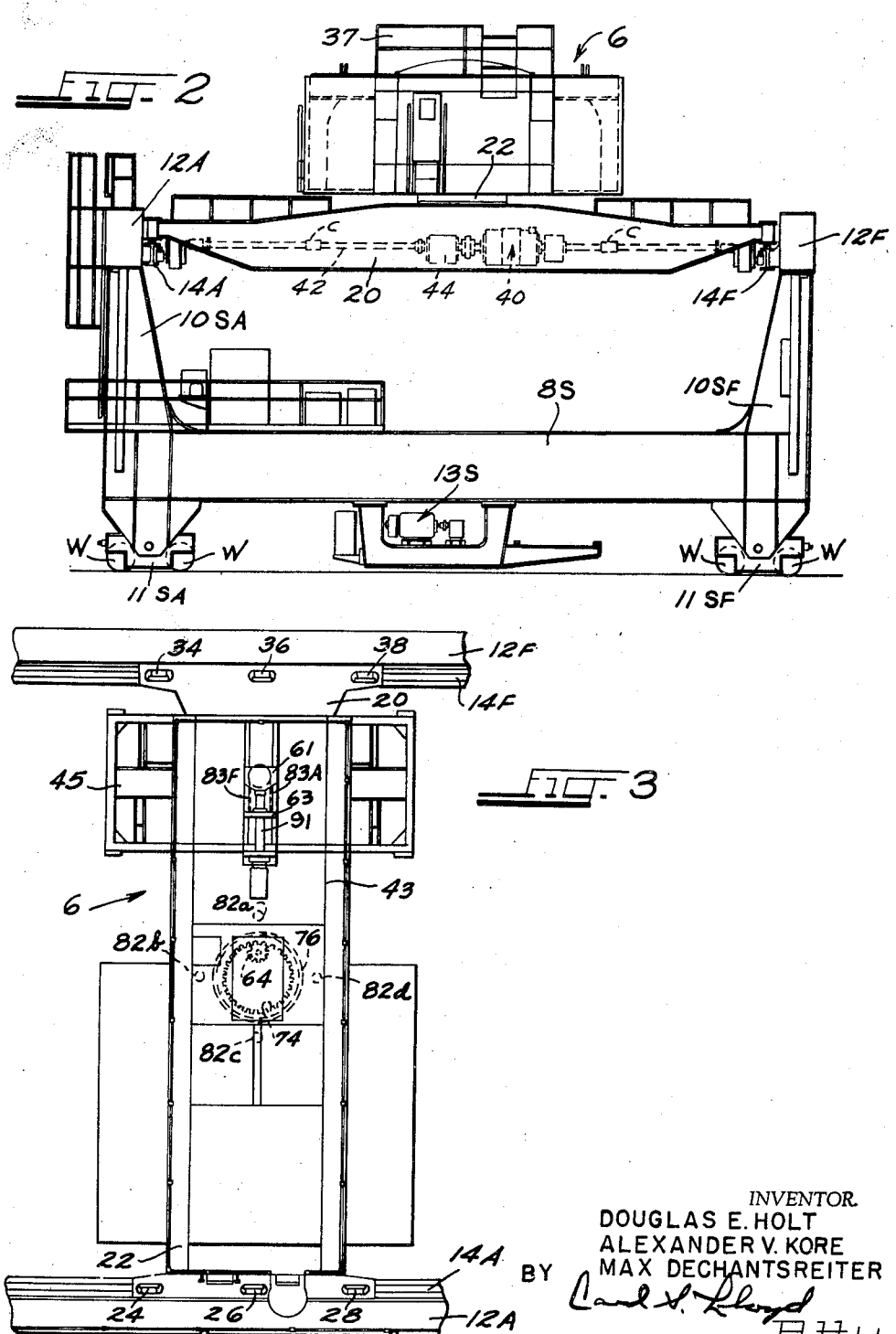

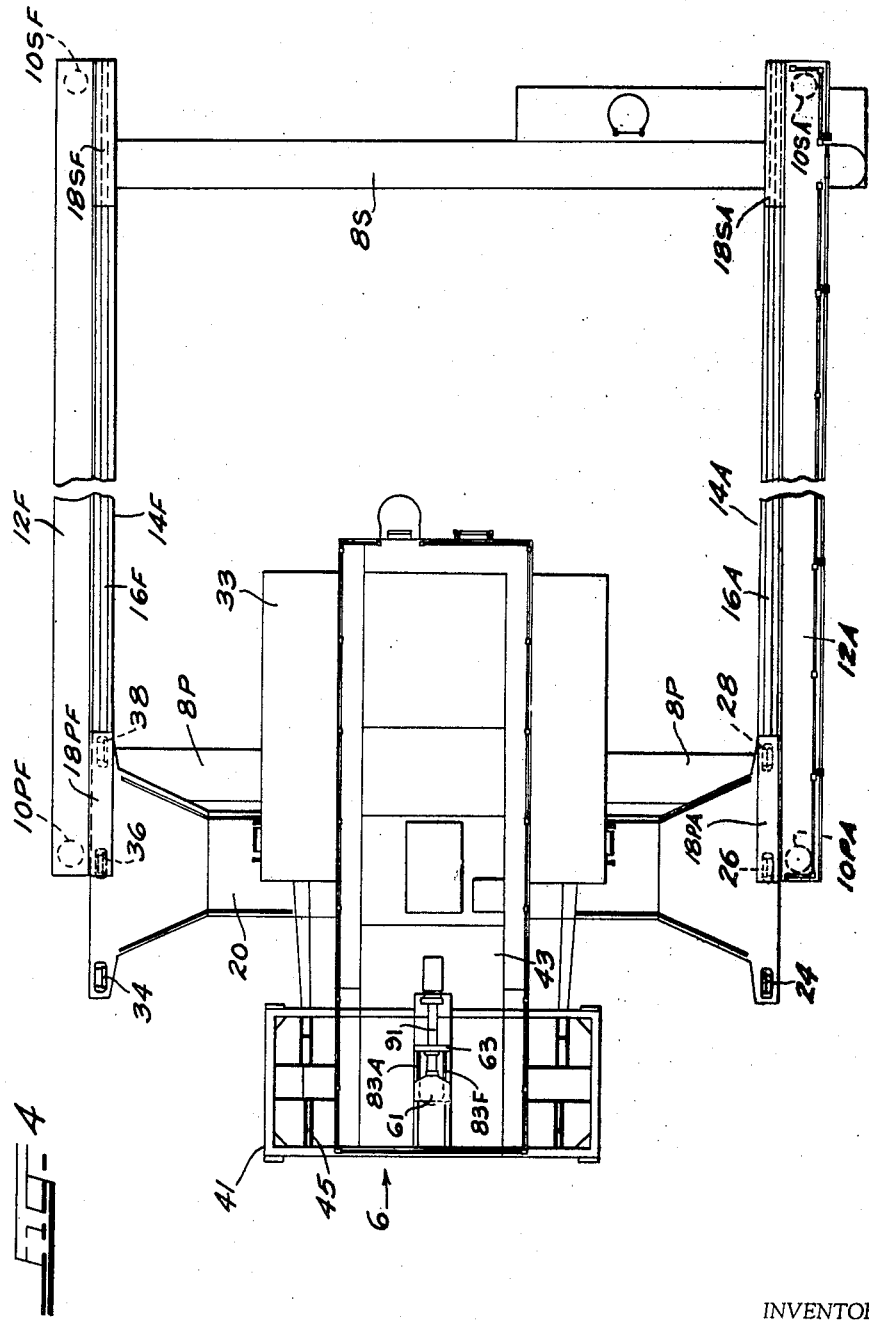

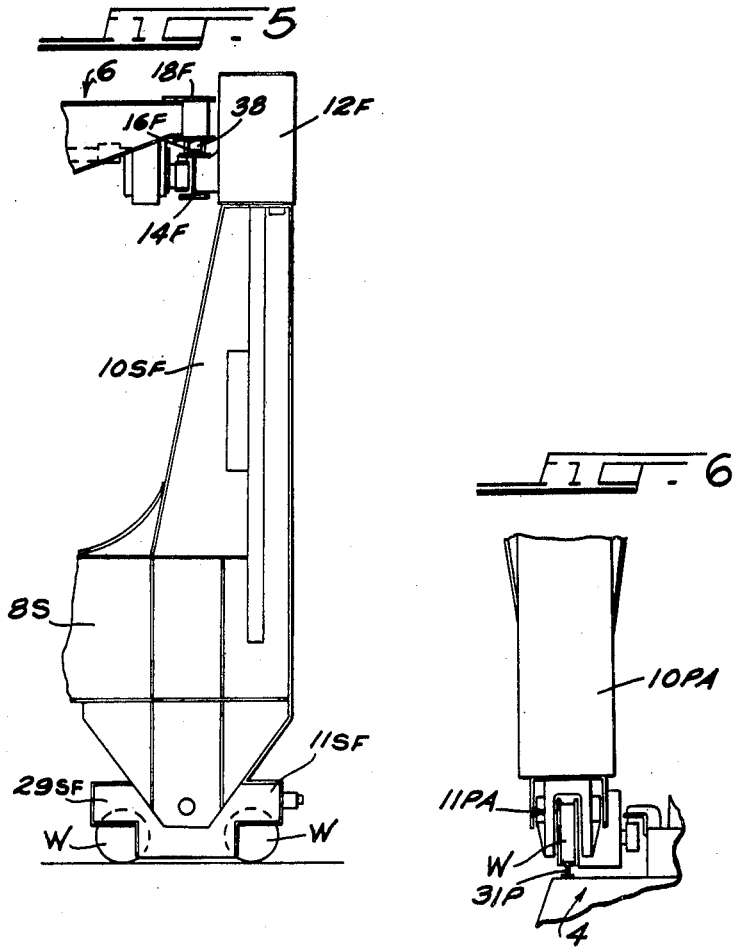

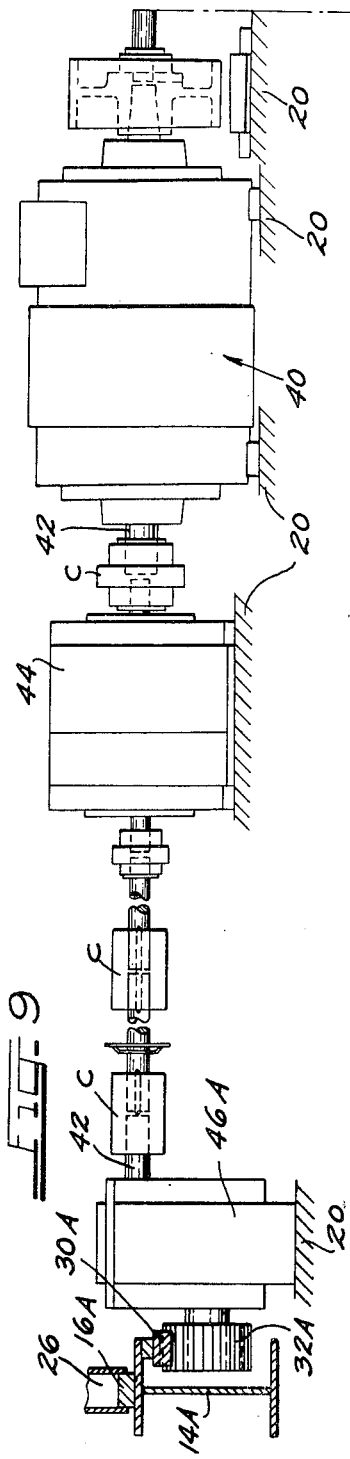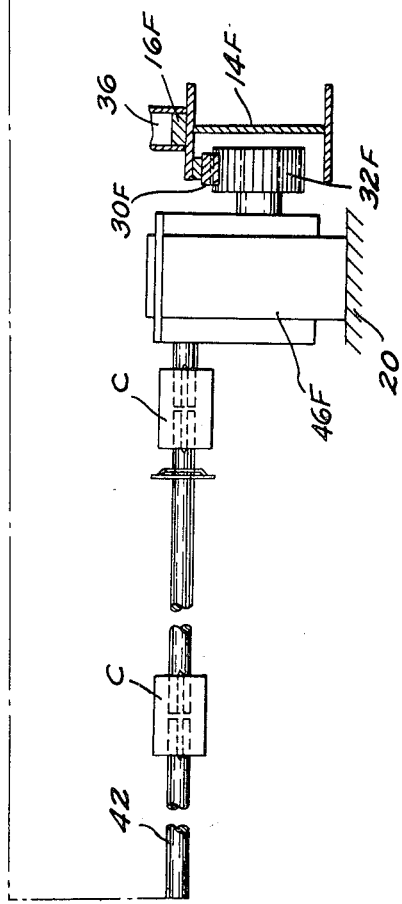
INVENTOR.
DOUGLAS E. HOLT
ALEXANDER V. KORE
MAX DECHANTSREITER

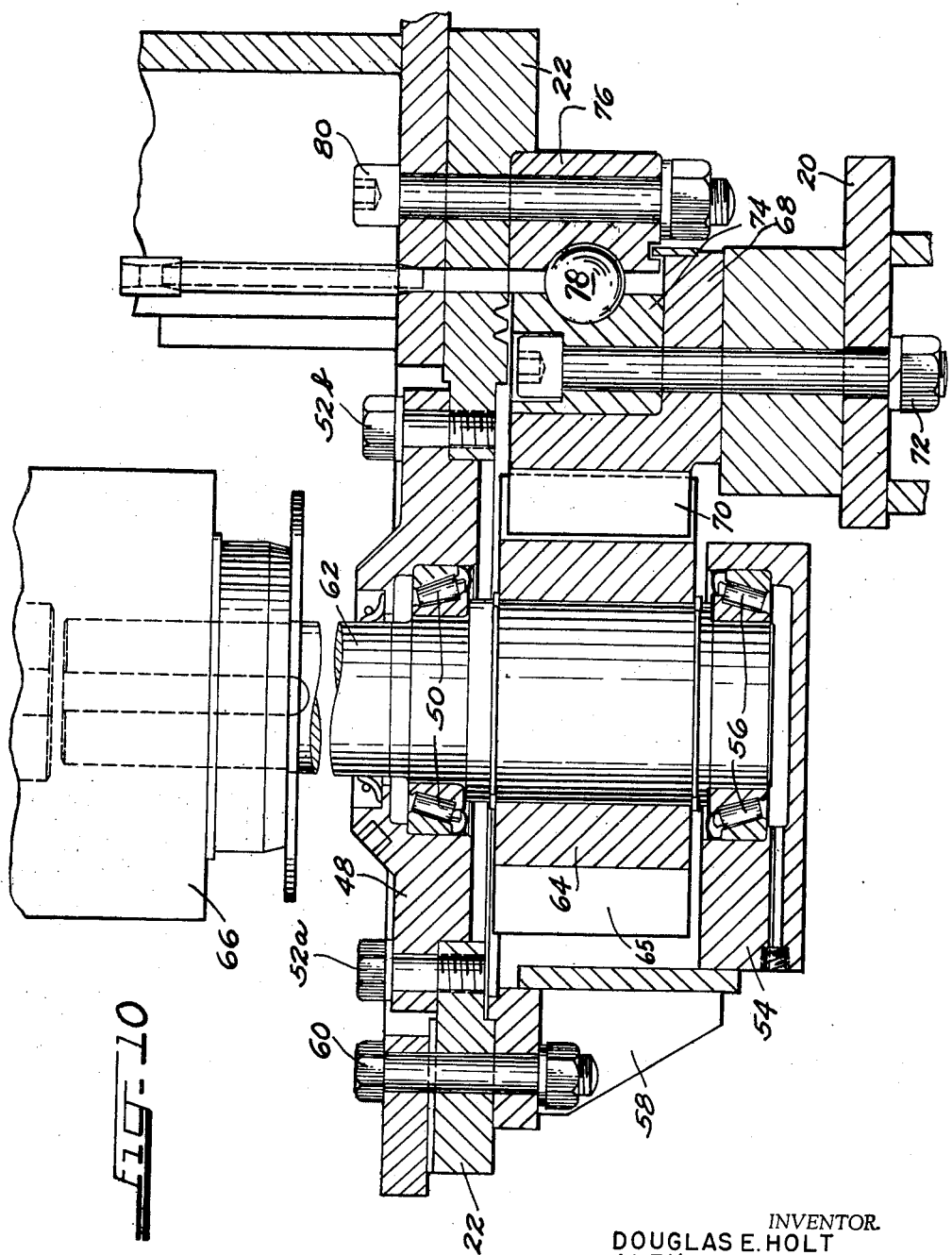

June 22, 1965  D. E. HOLT ETAL  3,190,456
SHIPBOARD CARGO TRANSFERRING APPARATUS
Filed July 11, 1963  12 Sheets-Sheet 8
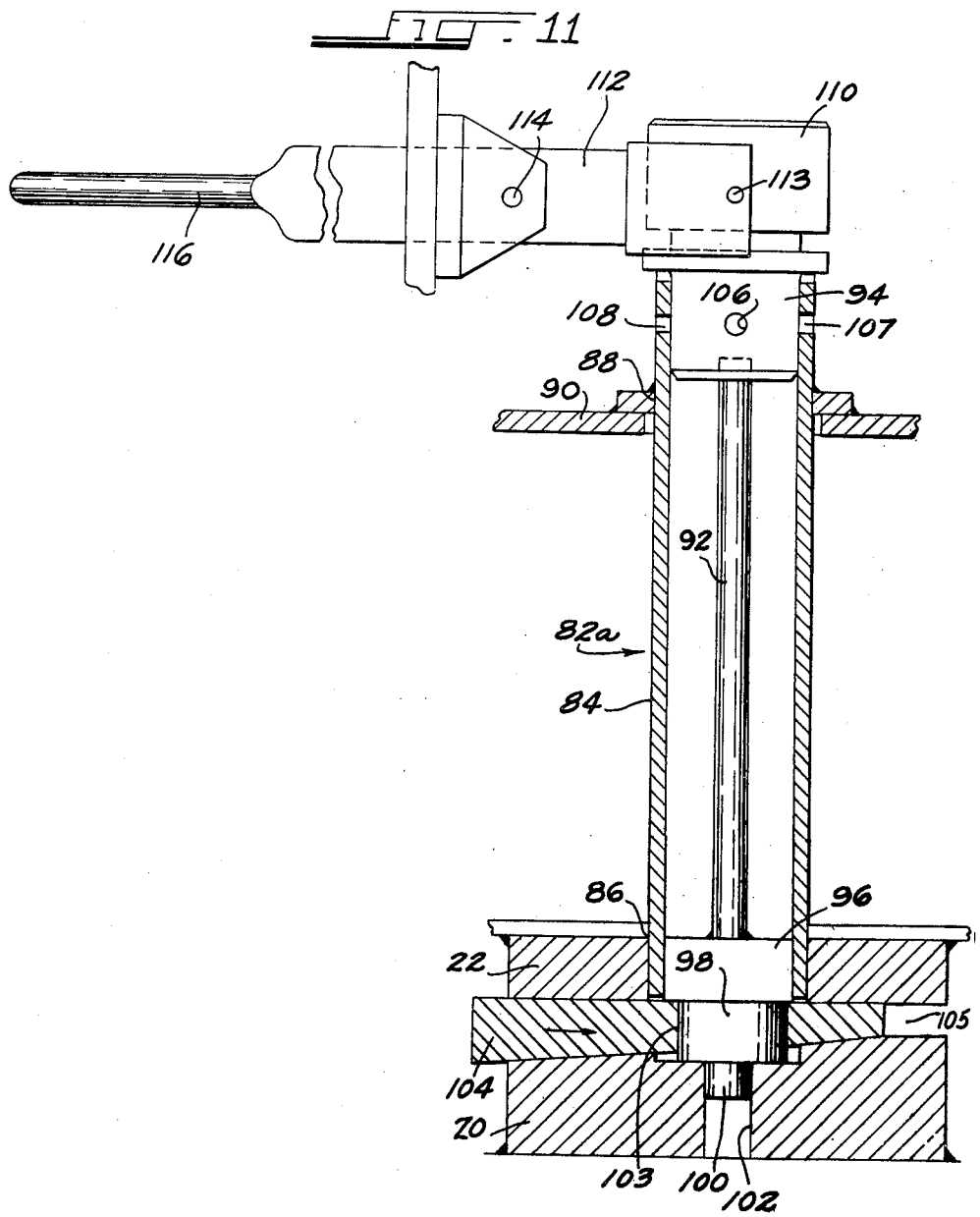
INVENTOR.
DOUGLAS E. HOLT
ALEXANDER V. KORE
MAX DECHANTSREITER
BY

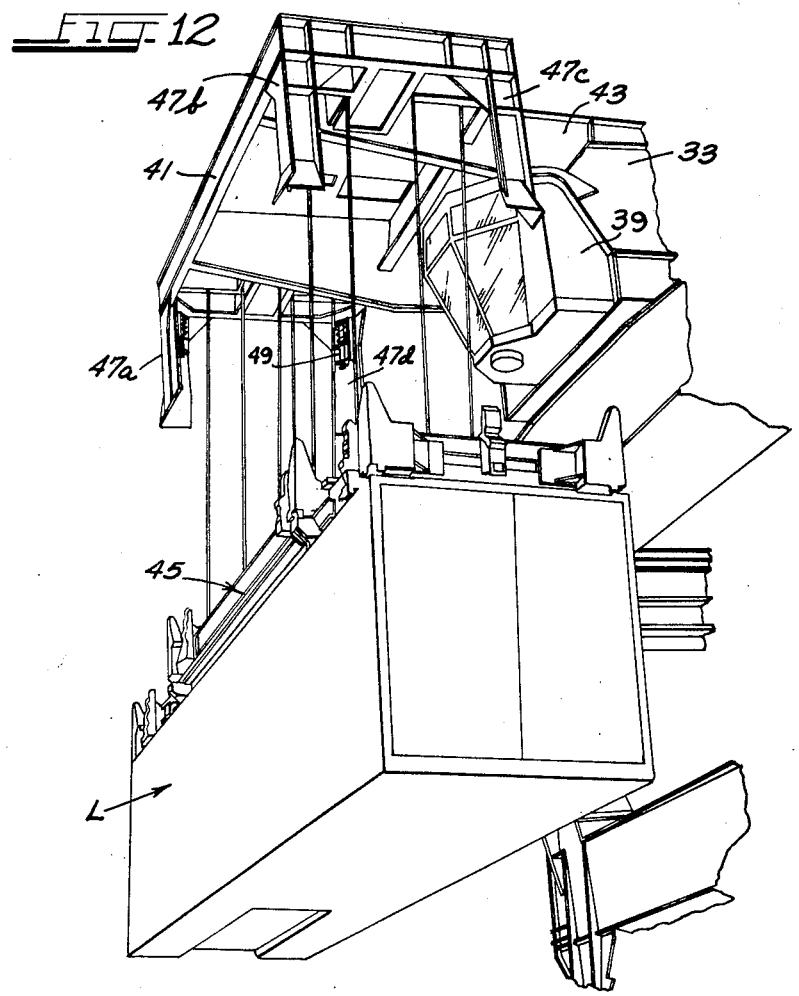

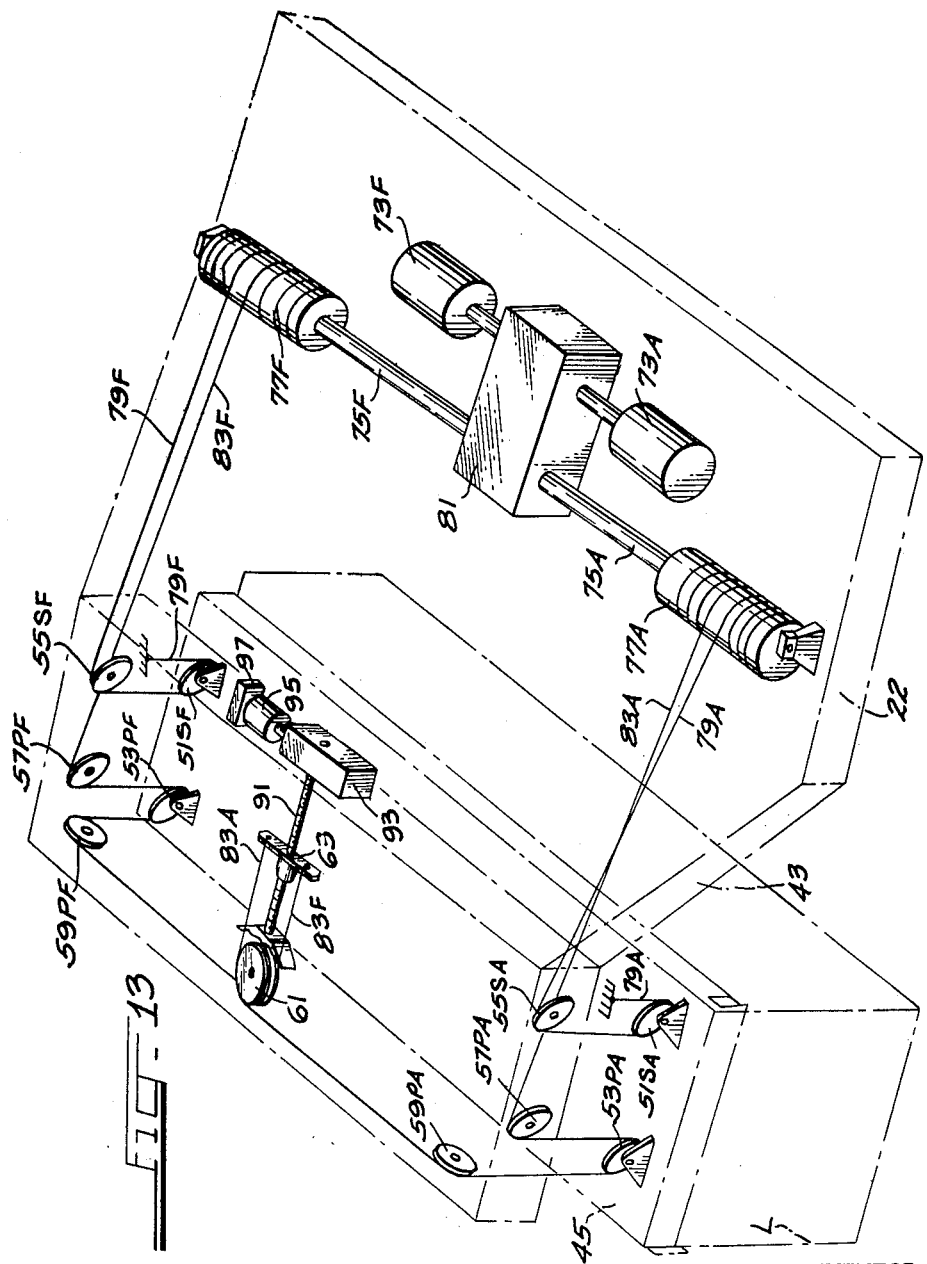

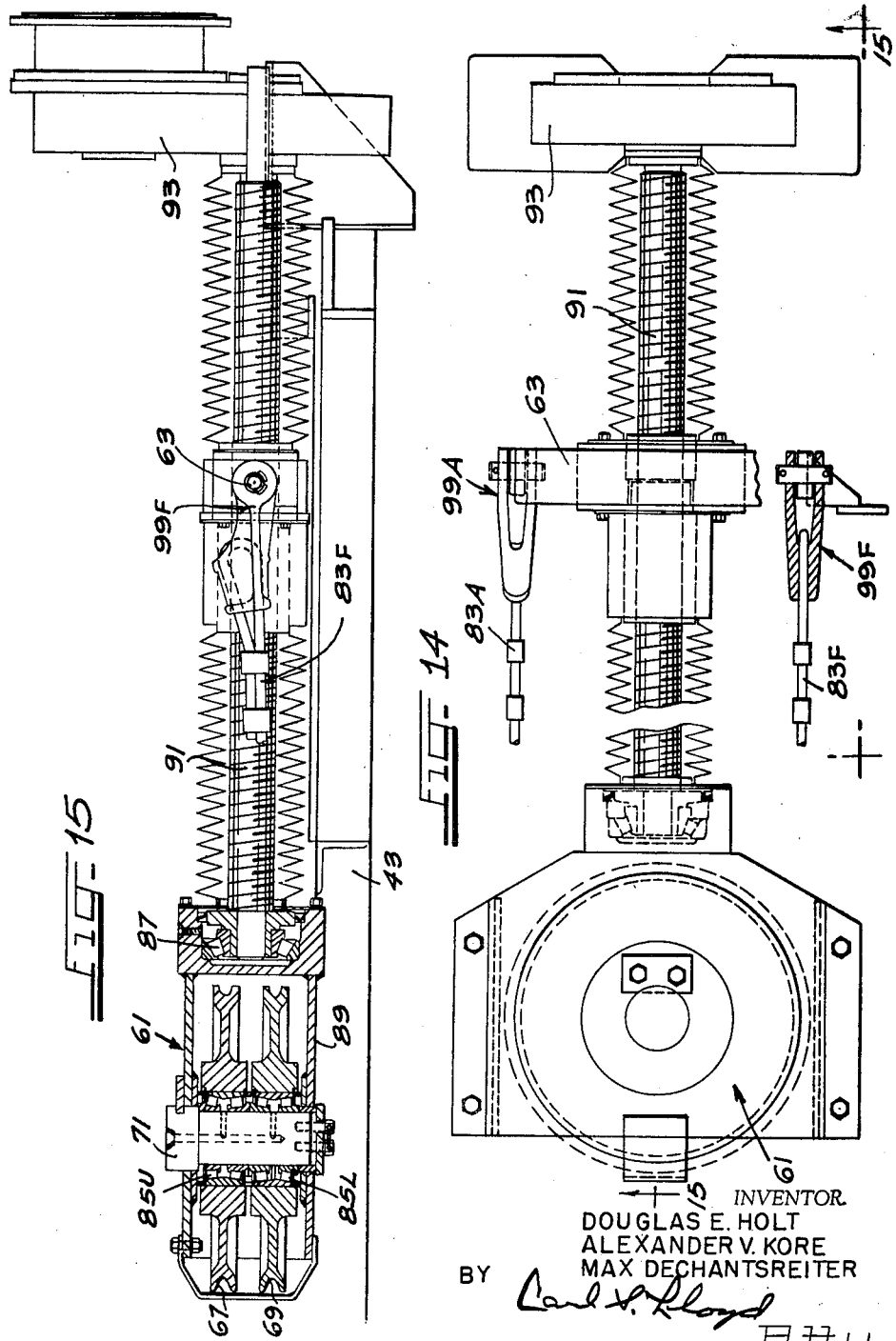

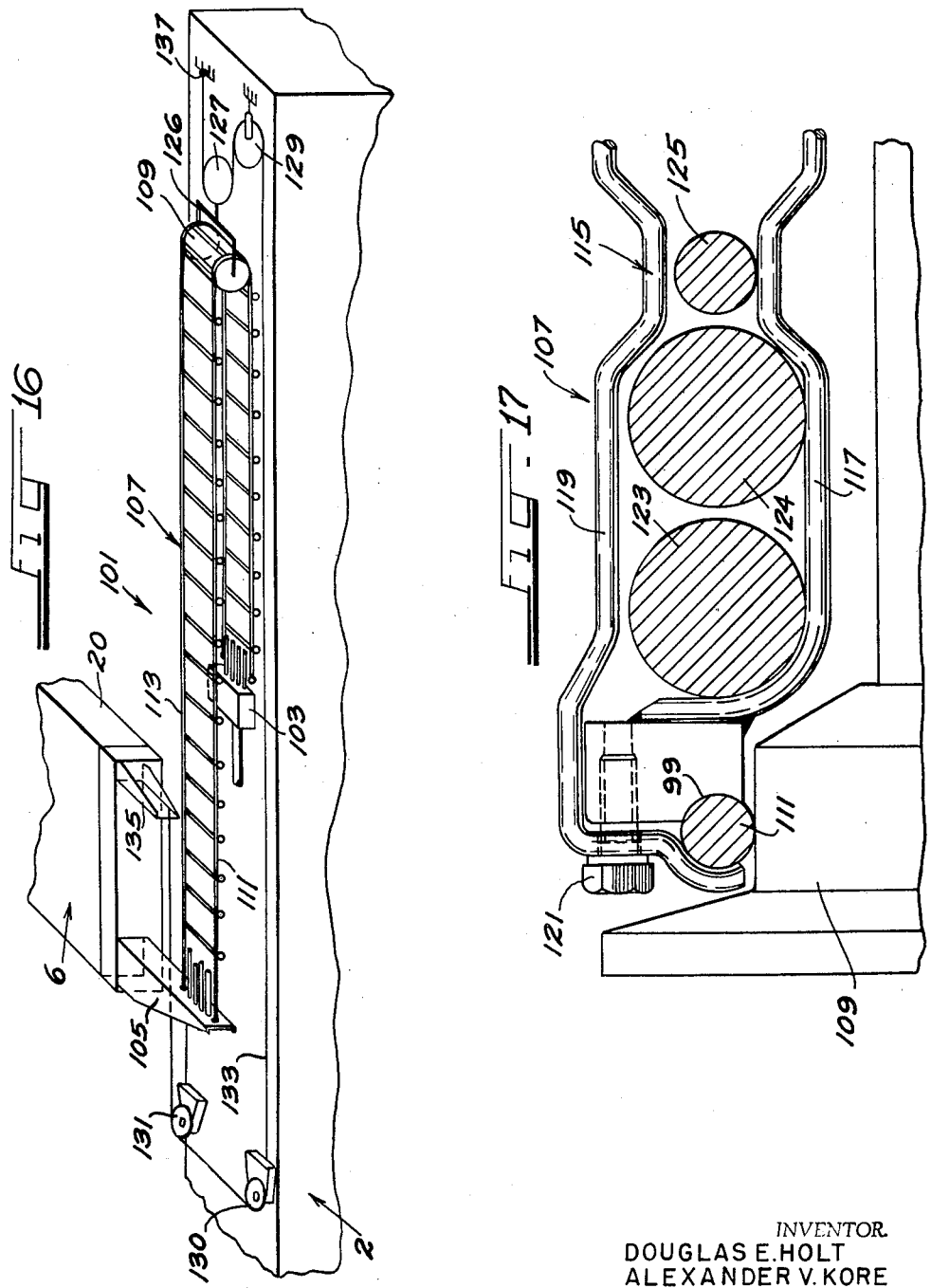

United States Patent Office 3,190,456
Patented June 22, 1965

3,190,456
SHIPBOARD CARGO TRANSFERRING APPARATUS
Douglas E. Holt, Mequon, Alexander V. Kore, West Allis, and Max Dechantsreiter, Milwaukee, Wis., assignors to Harnischfeger Corporation
Filed July 11, 1963, Ser. No. 294,329
10 Claims. (Cl. 212—14)

This invention relates to shipboard cargo transferring apparatus and more particularly to such an apparatus of a travelling U-type gantry construction which is capable of fore and aft translational movement relative to the vessel and which is provided with a rotatable trolley designed for athwartship port and starboard translational movement so as to load and unload containers at any desired point of the vessel and on either side thereof.

The subject apparatus, in the embodiment thereof illustrated in the accompanying drawings and hereinafter described, comprises a gantry structure in the form of two gantry sills which are equipped with four upwardly extending gantry shear legs between which are mounted two box girders. Side mounted beams are contained on each of the box girders, and inverted racks and trolley rails are provided on the beams for rack and pinion translational driving of a trolley structure athwartship from the port to starboard direction and vice versa. The gantry structures are also provided with four equalizer trucks located at the opposite corners thereof and with an inverted rack and pinion gantry drive assembly located on the port and starboard sides thereof intermediate each pair of equalizer trucks.

The trolley structure comprises a lower translational trolley frame and an upper revolvable trolley frame which is adapted for rotation through a 180° arc with respect to the lower frame. Ring bearing and internal ring gear structure are provided for cooperation with a pinion gear activated by the upper trolley frame to effect the described rotation. The upper trolley frame is also provided with a completely enclosed machinery housing for weather proofing purposes and with a uniquely located operator's cab which centralizes all the controls for the apparatus in a location such that the operator may view the hoisting and lowering of a load from the most desirable location.

A wedge-locking arrangement is provided to prevent rotation of the upper trolley frame relative to the lower trolley frame, when desired, as for example when the vessel is out at sea. In this manner, undue wear and brinnelling of the rotation bearings are avoided, and structural support for the load of the stowed upper trolley frame is provided.

Further features of the invention include the provision of a load levelling compensation arrangement for stabilizing the horizontal level of a hoisted load. A power loop system is also provided for maintaining the electrical cables which interconnect the movable trolley and the relatively stationary gantry crane in a tensionless, non-wearing position.

It is an object of this invention to provide a gantry structure for transferring cargo containers to and from a sea-going vessel, which apparatus is adapted for raising and lowering cargo containers on either the port or the starboard sides of the vessel.

It is also an object of the invention to provide a simple revolvable trolley arrangement for port to starboard translational movement in a gantry-type cargo transferring apparatus and to eliminate the cumbersome and unreliable cable drives, extensible booms, and dual trolley arrangements of prior art structures.

A further object is to provide a shipboard cargo transferring apparatus which is provided with a revolvable trolley adapted to rotate through two opposite 90° arcs from a stowed longitudinal fore to aft position to either port or starboard loading and unloading positions.

Additional objects are:

To provide a wedge-lock arrangement for locking a revolvable trolley in its cargo-handling or stowed positions and for partially absorbing the load of the trolley, thereby to avoid wear on the bearings, when the transferring apparatus is stowed in a nonoperative, sea-going position;

To provide inverted rack and pinion drive arrangements for both the translational movement of the trolley relative to the gantry crane and for the fore and aft translational movement of the crane itself whereby breakdowns due to ice collecting in the rack structure and due to contamination of the rack teeth by misplaced metal parts are obviated;

To provide an inverted rack and pinion drive arrangement for translational port to starboard movement of a trolley relative to a gantry crane whereby positive non-skew and non-tilting movement may be achieved;

To provide an inverted rack and pinion drive arrangement for a trolley which moves translationally from port to starboard in a manner which allows translational movement even over irregular and flexed tracks;

To provide an eddy current brake for arresting movement of the trolley on a downhill incline when a predetermined list is exhibited by the vessel;

To provide load level compensation means for automatically positioning a hoisted load at a predetermined level, regardless of ship list;

To provide a power loop cable carrying system which maintains the electrical cables interconnecting the movable trolley and the relatively stationary gantry crane in a tensionless, non-wearing disposition;

To locate an operator's cab or cockpit in a unique position relative to the hoisted load whereby the operator may effectively control the hoisting thereof due to enhanced viewability of the load situs;

To provide an enclosed weather proof housing for the electrical and other machinery carried by the trolley;

To provide a unique snubber frame which guides the load grappling spreader and prevents swinging or swaying of a grasped load and which is provided with spring-cushioned safety shock absorbers;

To provide a shipboard cargo transferring apparatus which is safe and economical and which minimizes the dock time required for transferring cargo to and from a vessel; and To provide a shipboard cargo transferring apparatus which may be operated by a single individual from a prime location for viewability of the cargo.

These and other objects, advantages, and features of the subject invention will hereinafter appear, and, for purposes of illustration, but not of limitation, an exemplary embodiment of the subject invention is shown in the appended drawings, in which:

FIGURE 1 is a transverse elevational view from aft to fore of a deck of a vessel equipped with a shipboard cargo transferring apparatus constructed in accordance with the subject invention;

FIGURE 2 is an elevational end view of the apparatus of FIGURE 1 from the starboard side of the deck;

FIGURE 3 is a fragmentary top plan view showing a rotatable trolley of the transferring apparatus in stowed fore to aft aligned position;

FIGURE 4 is a top plan view showing the trolley in an operative port side position;

FIGURE 5 is an enlarged fragmentary portion of the lower right hand side of FIGURE 2;

FIGURE 6 is an enlarged fragmentary portion of the lower left hand side of FIGURE 1;

FIGURE 7 is a fragmentary front prospective view of a gantry drive assembly;

FIGURE 8 is a similar rear prospective view of the gantry drive assembly;

FIGURE 9 is a schematic diagram of a trolley drive arrangement;

FIGURE 10 is a view in section showing means for rotating the trolley;

FIGURE 11 is a view in section of a wedge-locking arrangement for preventing rotation of the revolvable trolley;

FIGURE 12 is a fragmentary front prospective view of the trolley, showing an operator's cab and a load being handled by a snubber frame of the trolley;

FIGURE 13 is a schematic diagram of a load levelling compensation arrangement for maintaining a predetermined level as a load is raised or lowered from the trolley;

FIGURE 14 is a detailed plan view of a portion of the load levelling compensation arrangement;

FIGURE 15 is a partially sectional view taken along the line 15—15 of FIGURE 14;

FIGURE 16 is a schematic diagram of a power loop arrangement for handling the electrical cables leading to the trolley; and FIGURE 17 is an enlarged fragmentary schematic view of a cable carrier employed in the power loop system.

General arrangement

With reference to the drawings, the numeral 1 generally designates a shipboard cargo container transferring apparatus produced in accordance with the subject invention. The apparatus 1 comprises a travelling U-type gantry crane 2 which is mounted on the deck 4 of a ship for movement relative thereto. The gantry crane 2 is adapted for fore and aft translational movement relative to the deck 4 and a trolley assembly 6 is mounted on the crane 2 for athwartship port to starboard translational movement relative to the deck 4 and for rotational movement to face either the port or starboard sides.

The gantry crane 2 comprises port and starboard gantry sills 8P and 8S respectively. Four shear legs extend perpendicularly upwardly from the respective ends of the gantry sills 8P and 8S. These legs comprise two port side shear legs 10PA and 10PF located aft and fore respectively and two starboard side shear legs 10SA and 10SF located aft and fore respectively. Fore and aft box girders 12F and 12A respectively are mounted between the four shear legs 10PF and 10SF and between the aft shear legs 10PA and 10SA respectively, to complete the basic U-type gantry structure. Each box girder 12F and 12A is provided with a side mounted beam 14F and 14A respectively. The said beams, in conjunction with four stabilizing plates 18PF, 18SF, 18PA, and 18SA, support the trolley assembly 6, in a manner hereinafter described. Gateway structure, generally indicated at 9, is provided on the gantry crane 2 for accessibility to the trolley assembly 6.

Translatable lower trolley frame

The trolley assembly 6 comprises a lower trolley frame 20 which is adapted for athwartship port to starboard translational movement and an upper revolvable trolley frame 22 for rotational movement relative to the lower trolley frame 20, as hereinafter described. As best seen in FIGURE 4, the opposite ends of the lower trolley frame 20 are provided with suitably journalled rim-wheels 24, 26, 28 and 34, 36, 38. The beams 14A and 14F of the crane 2 are provided with rails 16A and 16F respectively, and the indicated rim-wheels are positioned on the said rails for rotational and translational movement thereover.

Inverted racks 30A and 30F are mounted on the underside facing interiors of the respective beams 14A and 14F, as best seen in FIGURE 9. Pinion wheels 32A and 32F mesh with the respective racks 30A and 30F. The pinion wheels 32A and 32F are both driven from a drive motor 40 which is suitably mounted on the hollow interior of the lower frame 20, as indicated in FIGURES 2 and 9. The motor 40 drives a shaft assembly 42 which comprises a series of individual shaft lengths suitably interconnected by bearing couplings C. The opposite ends of the shaft assembly 42 drive gear reduction units 46A and 46F, which in turn drive the respective pinion wheels 32A and 32F.

A conventional induced-current brake 44 is located adjacent the drive motor 40 and is adapted to arrest the motion of the shaft assembly 42 upon appropriate energization. The induced-current brake 44 is preferably a direct current electromagnetic member which may be energized to establish a magnetic field, which field gives rise to torque resisting, induced current for impeding the movement of the shaft assembly 42. In the described embodiment, the brake 44 is adapted for automatic energization by suitable level sensing means (not shown) when the trolley assembly 6 traverses a downhill incline of six or more degrees, whereby gravitational acceleration of the trolley assembly 6 is minimized when the deck 4 exhibits the indicated six or more degrees list. Of course, the brake 44 may also be set for manual excitation.

It should be noted that the centrally disposed wheels 26 and 36 of the lower trolley frame 20 are respectively located in axial alignment with the pinion wheels 32A and 32F so that a positive drive of the trolley assembly 6 relative to the gantry crane 2 may be achieved, notwithstanding irregularities or curvatures inherent in the side beams 14A, 14F and rails 16A, 16F. With the described arrangement, the centrally disposed wheels 26, 36 will always engage the respective rails 16A and 16F as rotation of the pinion wheel 32A and 32F causes athwartship translational movement of the trolley assembly 6. Interior or starboard wheels 28, 38 (relative to the FIGURE 4 disposition) will be retained upon the respective rails 16A, 16F, although the port wheels 24, 34 will extend outwardly beyond the gantry crane 2 in free space. The stabilization plates 18PA, 18PF serve as a safety feature to prevent any tilting of the trolley assembly 6 in the indicated portside disposition.

For starboard side loading or unloading, the trolley assembly 6 is positioned oppositely from its FIGURE 4 disposition, with the starboard wheels 28, 38 being disposed in free space and with the centrally disposed wheels 26, 36 and the port wheels 24, 34 engaging the respective rails 16A, 16F. In this starboard disposition, the stabilization plates 18SA and 18SF perform the analagous anti-tilting function. As a further safety feature, limit switches (not shown) are provided in the path of movement of the wheels 26, 36 to prevent travel of the rolley assembly 6 beyond the indicated extreme portside and staboard side dispositions. In this manner, it is possible to extend the load handling structure of the trolley assembly, as hereinafter described, beyond either side of the vessel without utilizing cumbersome and unwieldy arrangements such as extensible or telescoping trolley booms or dual trolley arrangements.

The combination of the pinion wheels 32A, 32F intermeshing with the inverted racks 30A, 30F and of the rim wheels 24, 26, 28 and 34, 36, 38 riding upon the respective rails 16A, 16F in the described two-on one-off stabilized arrangement provides a unique and simple positive drive sequence for translational movement of the trolley assembly 6, even when the vessel is listing. Complex and space-consuming winch and cable arrangements are thereby eliminated, and a simple rack and pinion drive is provided for non-skew and non-tilting positive engagement. Also, the provision of the inverted racks 30A, 30F allows for self-draining of the rack structure so that deleterious ice formations are obviated. Likewise, the inverted rack is not subject to the problem of contamination of the rack teeth by small misplaced items, such as tools, bolts, and the like.

Rotatable upper trolley frame

Means for rotating the upper revolvable trolley frame 22 relative to the lower trolley frame 20 are schematically illustrated in dash line in FIGURE 3 and are shown in detail in FIGURE 10. An upper bearing block 48 is affixed to the upper trolley frame 22 by bolts 52a, 52b. Similarly, a lower bearing block 54 is affixed to the frame 22, via an interconnecting L-plate 58, by means of a bolt assembly 60. The bearing blocks 48 and 54 are provided with the bearing assemblies 50 and 56 respectively, and a shaft 62 is journalled for rotation therein.

A pinion wheel 64 is affixed to the shaft 62 for rotation therewith, and a motor and reduction drive means 66 is provided for rotation of the shaft 62 and therefore of the pinion wheel 64. A circular ring gear 68 is mounted on the lower frame 20 by a bolt assembly 72, and the ring gear 68 is provided with internal circumferentially spaced teeth 70 which are adapted to mesh with teeth 65 of the pinion wheel 64.

An internal ball-bearing race 74 is mounted on a flange of the ring gear 68 by the same bolt assembly 72 which mounts the ring gear 68 to the lower frame 20. An external ball-bearing race 76 is affixed to the upper frame 22 by a bolt assembly 80, and a ball bearing assembly 78 is sandwiched between the races 74 and 76 in a conventional manner.

In this manner, appropriate energization of the motor and reduction drive means 66 will cause a corresponding rotation of the pinion wheel 64 and, via the intermeshing of the pinion wheel 64 and the ring gear 68, rotation of the revolvable upper trolley frame 22 relative to the stationary lower trolley frame 20. Limit switches (not shown) are provided so that the trolley assembly 6 may be rotated 90° to port or to starboard from the stowed position shown in FIGURE 3.

Wedge lock assembly

Locking means are provided for preventing rotation of the revolvable upper trolley frame 22 relative to the lower trolley frame 20, when desired. These means comprise four wedge lock assemblies 82a-d which are schematically illustrated in FIGURE 3 and one of which, 82a, is shown in detail in FIGURE 11. The assembly 82a comprises a guide housing 84 which is mounted in a bearing socket 86 of the upper revolvable trolley frame 22 and in a bearing socket 88 of a frame portion 90 of the trolley frame 22. A torsion tube 92 is positioned within the housing 84 and is adapted for rotation therein. An upper bearing 94 and a lower bearing 96 centrally position the torsion tube 92 within the housing 84.

An eccentric member 98 is affixed adjacent the lower end 100 of the torsion tube 92, and the said lower end 100 is received in a bearing socket 102 of the lower trolley frame 20. A wedge-shaped block 104 is provided with an opening 103 which may receive the eccentric member 98 therein, such that rotation of the member 98 induces rotation of the block 104. As shown in FIGURE 11, the wedge-block 104 is sandwiched within a space 105 between the frames 20 and 22.

The upper bearing 94 is provided with a pin slot 106 which is adapted to align with apertures 107, 108 of the housing 84 so that a cotter pin (not shown) may be received through the apertures 107, 108 and the slot 106 in order to fix the rotational position of the torsion tube 92. A head member 110 is affixed to the uppermost extreme of the torsion tube 92, and a yoke member 112 is affixed to the head member 110 by a link 113. In the case of the assembly 82a, a handle element 116 is pivoted to the yoke 112, as indicated at 114, so that the torsion tube 92 may be axially or rotationally displaced by appropriate manipulation of the handle element 116. The handle element extends into an operator's cab, hereinafter described, so that the upper frame may be locked in either the operative port or starboard dispositions by appropriate rotation of the block 104 between the frames 20 and 22, as hereinafter described.

Gantry drive means

The gantry drive means comprises a centrally disposed gantry drive assembly which is located beneath each gantry sill and equalizer trucks located beneath each shear leg of the gantry crane. For convenience, only the starboard side gantry drive means are illustrated and described herein, although the port side gantry drive means is symmetrically identical. The illustrated means comprises a gantry drive assembly 13S centrally disposed beneath the gantry sill 8S and two equalizer trucks 11SA and 11SF located beneath the gantry shear legs 10SA and 10SF respectively.

As best seen in FIGURE 5, the equalizer truck 11SF comprises a housing 29SF which is provided with two rim-wheels W suitably journalled for rotation therein. As best shown in FIGURE 6, the rim-wheels W ride upon a channel beam affixed to the deck floor of the vessel, as for example the channel beam 31P illustrated in FIGURE 6.

The gantry drive assembly 13S, as illustrated in FIGURES 7 and 8, comprises a U-shaped support mounting 23S, upon which is suitably placed a drive motor 15S, an electric brake 17S, a worm reducer assembly 19S, and a spur reduction assembly 21S. The drive assembly 13S operates a pinion wheel 25S, which is adapted to intermesh with a stationary inverted rack 27S affixed to the deck 4 of the vessel. The provision of a pinion wheel intermeshing with an inverted rack and the topside disposition of the wheels W provides a positive anti-skew drive for the gantry crane 2 in a fore and aft translational direction. It should also be noted that the inverted rack 27S achieves the same desirable results as previously described for the inverted racks 30F and 30A for the port to starboard translational movement of the trolley assembly 6.

Upper trolley frame structure

The upper trolley frame structure comprises an enclosed machinery housing 33 which is suitably mounted on the upper revolvable trolley frame 22. The housing 33, which is provided with an access door 35 (see FIGURE 1), encloses various machinery and electrical equipment contained in the trolley assembly 6. This arrangement provides weather and corrosion resistance, especially under heavy sea duty. Gateway structure, indicated by 37, is also provided on the housing 33.

A superstructure 43 extends from the housing 33, and an operator's cab 39 is disposed beneath the superstructure 43, as shown in FIGURES 1 and 12. In the described embodiment, the operator's cab 39 is an all glass-enclosed cockpit which enables an operator to control the apparatus 1 from a unique centrally disposed location overlooking the raising and lowering of a load, such as the load L shown in FIGURE 12.

A snubber frame 41 is affixed to the superstructure 43, as best seen in FIGURE 12. The snubber frame 41 guides the reception of a conventional load-grappling spreader assembly 45 which is raised and lowered from the snubber frame 41 in a manner hereinafter described. Four guide legs, 47a-d, extend perpendicularly downwardly from the snubber frame 41 and serve to prevent swinging of the load L as it is moved to an upper disposition adjacent the snubber frame 41 for translational movement with the trolley assembly 6. As seen in FIGURE 12, shock absorber means are provided in the snubber frame 41 as a safety feature. These means comprise a spring mounted bar 49 contained within each leg 47 extending from the snubber frame 41. Normally, the spreader 45 does not engage the bar 49, but in case a load is overdrawn upwardly, the spreader 45 will engage the bar 49, deflecting it against the force of its spring, thereby to prevent damage of the spreader 45 and the snubber frame 41.

Load levelling compensation

Load levelling compensation means are provided within the housing 33, and on the superstructure 43 as schematically illustrated in FIGURE 13. These means comprise four sheave assemblies 51SA, 51SF, 53PA, and 53PF affixed respectively to the four corners of the grappling spreader assembly 45. Corresponding sheaves 55SA, 55SF, 57PA, and 57PF are rotatably journalled in the superstructure 43. Two additional sheaves 59PA and 59PF are also rotatably journalled in the superstructure 43. A concentric sheave assembly 61, comprising concentrically mounted sheaves 67 and 69 (see FIGURES 14 and 15), is also carried by the superstructure 43 adjacent the port-side midpoint thereof (in accordance with the FIGURE 13 disposition).

Drive motors 73A, 73F energize a speed reduction unit 81, which in turn activates shafts 75A, 75F upon which are mounted cable drums 77A, 77F for rotation therewith. A cable 79A is trained about the drum 77A and about the sheaves 55SA and 51SA and is dead-ended on the superstructure 43. Similarly, a cable 79F is trained about the drum 77F and about the sheaves 55SF and 51SF and is dead-ended on the superstructure 43. Another cable 83A is trained about the drum 77A and about the sheaves 57PA, 53PA, 59PA, and 67 and is dead-ended on a yoke element 63 by a clamp assembly 99A. Similarly, a cable 83F is trained about the drum 77F and about the cable sheaves 57PF, 53PF, 59PF, and 69 and is dead-ended at the opposite extreme of the yoke 63 by a clamp assembly 99F. In this manner, rotation of the shafts 75A, 75F, and therefore of the drums 77A, 77F, will cause raising or lowering of a load L attached to the grappling spreader 45, as desired. However, in case the vessel lists, or for some other reason the load L is improperly aligned, load levelling compensation is achieved by induced movement of the yoke 63, as hereinafter described.

The concentric sheave assembly 61 comprises a housing 89 suitably affixed to the superstructure 43. A shaft 71 is fixedly mounted in the housing 89, and upper and lower bearings 85U and 85L respectively mount the sheaves 67 and 69 for rotation relative to the shaft 71. A bearing 87 provided in the end of the housing 89 rotatably journals a screw auger 91, the opposite end of which is journalled in a speed reduction unit 93. The speed reduction unit 93 is driven by a motor 95 which is adapted to be energized by a level-sensing device 97. The yoke 63 is provided with internal threadings which intermesh with the external threadings of the screw auger 91, such that rotation of the auger 91 causes translational port to starboard (or vice versa) movement of the yoke 63. In this manner, it is possible to apply appropriate tension to the cables 83A, 83F so as to cause rotational movement of the sheaves 53PA, 53PF relative to the sheaves 51SA, 51SF respectively, whereby a desired levelling of the load L may be achieved in accordance with the level sensed by the level-sensing device 97.

Power loop system

Means are provided for feeding electrical cables between the relatively stationary gantry crane 2 and the moving trolley assembly 6. In the described embodiment, these means, which are illustrated in FIGURES 16 and 17, comprise a junction box 103 which is affixed to the gantry crane 2 and a junction box 105 which is affixed to the lower frame 20 of the trolley assembly 6. A ladder-like cable carrier assembly 107 is affixed to the junction boxes 103 and 105 and is trained about a loop drum 109. The assembly 107 comprises two parallelly aligned cables 111 and 113 with a series of interconnecting cable carriers 115.

As best seen in FIGURE 17, the cable carriers 115 each comprise a lower cable support member 117 and an upper cable support member 119 which are interclamped, as by a bolt assembly 121. The members 117 and 119 are also secured to the cables 111, 113, as indicated at 99 in FIGURE 17. In this manner, flexible electrical cables, such as the cables 123-125 schematically illustrated in FIGURE 17, may be sandwiched between the members 117, 119 for appropriate connection to the respective junction boxes 103 and 105.

A bail 126 is connected to the loop drum 109, and a bridle sheave 127 is affixed to the bail 126. Dead-end sheaves 129, 130, and 131 are each affixed to the gantry crane 2. A tension cable 133 is affixed at one end to an extension 135 of the trolley assembly 6 and is trained about the successive sheaves 131, 130, 129, and 127, and is dead-ended on the gantry crane 2, as indicated at 137.

In this manner, translational movement of the trolley assembly 6 relative to the gantry crane 2 will provide for self-adjusting tensioning of the carrier assembly 107 since the tension on the cable 133 (and therefore the tension on the sheave 127) is a function of the relative positioning of the trolley assembly 6 and the gantry crane 2. It should be noted that virtually no tension is placed on the supported cables 123-125 themselves, since all the tensile load is carried by the cables 111, 113. Also, wear and abrasion of the cables 123-125 is minimized in the supported state since no slippage of the cables relative to the carriers 115 is evidenced, notwithstanding the tensioned repositioning of the assembly 107 as the trolley assembly 6 moves relative to the gantry crane 2.

Operation

In use, the shipboard cargo container transferring apparatus 1 is normally stowed in the longitudinal fore to aft disposition shown in FIGURE 3. The torsion tubes of each wedge-lock assembly 82a–d are in a lowered block-engaging position and the blocks of each assembly are interposed between the frames 20 and 22 such that rotation of the upper trolley frame 22 relative to the lower trolley frame 20 is impeded. As indicated in FIGURE 11, a cotter pin (not shown) may be received within the pin slot 106 and the apertures 107, 108 in order to maintain the stowed non-operative position. With this arrangement, as much as forty percent of the load of the upper trolley frame 22 can be supported by the interposed wedge-blocks so that undue wear and brinnelling of the rotation bearings are avoided, even when the transferring apparatus 1 is jostled about in heavy seas. Also, suitable pin means (not shown) may be provided for locking the trolley assembly 6 relative to the gantry crane 2 and for locking the gantry crane 2 relative to the deck 4 of the vessel.

When the vessel is docked and it is desired to load or unload cargo, an operator enters the housing 33 via the access door 35 and removes each of the cotter pins from the wedge-lock assemblies 82a–d. The operator then manually rotates each of the wedge-lock assemblies such that the wedge-blocks thereof are removed from locking interposition between the frames 20 and 22. The torsion tube of each wedge-lock assembly is then manually elevated, and the cotter pin thereof is reinserted through the pin slot 106 so as to overlie the upper edge of the tubular guide housing 84. In this position, the upper trolley frame 22 is free to rotate relative to the lower trolley frame 20, as desired.

The operator then enters the cab 39 and energizes the motor and reduction means 66 in order to rotate the trolley assembly 6 through a 90° arc in either direction, as for example to a portside disposition as shown in FIGURE 1. After the described rotation has been effected, the operator grasps the handle element 116, which extends into the cab 39, and lowers the torsion tube 92 of the wedge-lock assembly 82a in order to engage the eccentric member 98 with the wedge-block 104 and then rotates the wedge block 104 into locking engagement between the frames 20 and 22. Only one wedge-lock assembly (i.e., the wedge-lock assembly 82a) is utilized in this phase of the operation, since the locking of one such assembly will effectively secure the trolley assembly 6 in the desired orientation.

The operator then energizes the gantry drive means (such as the gantry drive assembly 13S) so as to translate the gantry crane 2 to a desired fore and aft disposition overlooking a cargo hold. The operator then energizes the drive motor 40 of the trolley assembly 6 in order to position the trolley assembly 6 over a given load to be removed.

As the trolley assembly 6 is thus moved in the port or starboard directions, the power loop system illustrated in FIGURES 16 and 17 maintains electrical connection between the junction box 105 of the trolley assembly 6 and the junction box 103 of the gantry crane 2 without imposing tension upon the connecting electrical cables themselves and without affording any opportunity for slippage of the electrical cables relative to a wear surface. Also, in case the vessel is listing, the brake 44 of the trolley assembly 6 automatically decelerates the driven movement of the trolley assembly 6 on any downward incline which exceeds the predetermined six or more degrees of list.

When a position overlying a given load is achieved, the operator lowers the load grappling spreader 45 into engagement with the load. The load is then elevated out of the cargo hold by appropriate energization of the motors 73A, 73F, and the trolley assembly 6 is caused to move to its extreme portside disposition with the superstructure 43 and its attached snubber frame 41 extending over onto the dock area. Appropriate energization of the motors 73A, 73F then causes the load to be lowered onto the dock with automatic load levelling compensation being achieved by means of appropriate translational movement of the yoke 63 as determined by the level-sensing device 97. Of course, the operator may manually control the list of the load by an appropriate cut-in switch (not shown) for the motor 95 of the load levelling compensation arrangement.

When the load has been placed on the dock, it is removed from the grappling spreader 45 in a conventional manner, and the previously described operation is reversed until the trolley assembly 6 is again present over another load which is to be removed from the cargo hold. Loading from the dock into the cargo hold is of course effected by reversing the described sequence. Similarly, loading and unloading on the starboard side is achieved in an analogous manner by merely rotating the trolley assembly 6 through an opposite 90° arc.

When loading or unloading operations are completed, the trolley assembly 6 is returned to its stowed longitudinally aligned position shown in FIGURE 3, and the wedge-lock assemblies 82a–d are reactivated by reversing the unlocking procedures originally described. In the foregoing manner, it is possible to load or unload a vessel equipped with the transferring apparatus 1 in an absolute minimum of time from the stowed to operative to stowed positions of the trolley assembly 6. Also, it is possible to load or unload the vessel from either side thereof and, if required, to load or unload a given vessel on both sides thereof (as for example, portions of the cargo being placed on a port side dock and other portions of the cargo being placed on a starboard side dock). Throughout the entire operation, only one individual is required for operation of the apparatus 1, and his location in the cab 39 affords maximum viewability for loads being carried, raised, or lowered from the superstructure 43 of the trolley assembly 6.

While the foregoing description relates to a specifically disclosed embodiment of the invention, it should be understood that various changes, alterations and modifications may be effected in the details of construction and arrangements of the various elements, without departing from the spirit and scope of the instant invention, as defined in the appended claims.

What is claimed is:
1. Shipboard cargo transferring apparatus comprising:
   a gantry crane;
   gantry drive means for mounting the crane on the deck of a vessel for translational fore and aft movement thereover;
   a trolley assembly comprising a lower trolley frame and an upper trolley frame;
   trolley drive means mounting the lower trolley frame on the crane for translational port and starboard movement relative thereto;
   trolley rotation means rotatably mounting the upper frame on the lower trolley frame;
   a superstructure on the upper trolley frame and adapted to extend over the side of the vessel; and
   load engaging means suspended from the superstructure for moving a cargo load,
   whereby the vessel may be loaded or unloaded from either the port or starboard sides thereof.
2. Apparatus as claimed in claim 1 and further comprising locking means for positioning the upper trolley frame relative to the lower trolley frame in a longitudinally aligned fore and aft direction.
3. Apparatus as claimed in claim 1 and further comprising housing means enclosing the upper trolley frame in a sheltered housing and providing an operator's cockpit beneath the superstructure of the upper trolley.
4. Apparatus as claimed in claim 1 and further comprising load levelling compensation means for maintaining a predetermined horizontal disposition of an engaged load.
5. Apparatus as claimed in claim 1 and further comprising power loop means for feeding electrical cables between the trolley assembly and the gantry crane in a tensionless, non-wearing disposition.
6. Apparatus as claimed in claim 1 and further comprising a snubber frame on the superstructure and having four quadrangularly spaced depending legs and a shock absorber assembly on each leg.
7. Shipboard cargo transferring apparatus comprising:
   a U-type gantry crane;
   gantry drive means for mounting the crane on the deck of a vessel for translational fore and aft movement thereover;
   a trolley assembly comprising a lower trolley frame and upper trolley frame;
   trolley rotation means rotatably mounting the upper trolley frame on the lower trolley frame;
   locking means for positioning the upper trolley frame relative to the lower trolley frame in a longitudinally aligned fore and aft direction;
   trolley drive means mounting the lower trolley frame on the crane for translational port and starboard movement relative thereto;
   housing means enclosing the upper trolley frame in a sheltered housing and providing a superstructure extending from the housing;
   an operator's cockpit disposed on the upper trolley frame beneath the superstructure;
   load-engaging means on the superstructure for moving a cargo load;
   load levelling compensation means for maintaining a predetermined horizontal disposition of an engaged load; and
   power loop means for feeding electrical cables between the trolley assembly and the gantry crane in a tensionless, non-wearing disposition,
   whereby the vessel may be loaded or unloaded at variable longitudinal fore and aft positions and from either the port or the starboard sides thereof.
8. Shipboard cargo container transferring apparatus comprising:
   a U-type gantry crane;

gantry drive means for mounting the crane on the deck of a vessel for translational fore and aft movement thereover and including a motor driven inverted rack and pinion drive assembly;

a trolley assembly comprising a lower trolley frame and an upper trolley frame;

trolley drive means mounting the lower trolley frame on the crane for translational port and starboard movement relative thereto and including a motor driven inverted rack and pinion drive assembly;

trolley rotation means rotatably mounting the upper trolley frame on the lower trolley frame and comprising a ring gear on the lower trolley frame, a motor driven intermeshing pinion wheel on the upper trolley frame, and a bearing interconnecting the lower trolley frame and the upper trolley frame; and load engaging means on the upper trolley frame for vertically moving a cargo load, whereby the vessel may be loaded or unloaded from either the port or the starboard sides thereof.

9. Apparatus as claimed in claim 8 and further comprising a wedge lock assembly for fixedly positioning the upper trolley frame relative to the lower trolley frame and including an eccentrically mounted wedge block adapted for interposition between the lower trolley frame and the upper trolley frame in order to impede relative movement therebetween.

10. Apparatus as claimed in claim 8 in which the upper trolley frame comprises an enclosed housing, a load-engaging superstructure extending from the housing, and an operator's cockpit extending from the housing beneath the superstructure.

References Cited by the Examiner
UNITED STATES PATENTS

| | | | |
|---|---|---|---|
| 315,113 | 4/85 | Bidwell | 307—145 |
| 645,015 | 3/00 | Reed | 307—145 |
| 2,966,237 | 12/60 | Gallaher | 188—71 |
| 3,031,035 | 4/62 | Tomita | 188—71 |
| 3,034,659 | 5/62 | Willison | 212—14 |
| 3,051,321 | 8/62 | Ramsden | 212—14 |
| 3,061,112 | 10/62 | Bevard | 212—74 |
| 3,077,992 | 2/63 | Bevard | 212—15 |
| 3,083,838 | 4/63 | Bevard | 212—74 |
| 3,102,642 | 9/63 | Zweifel | 212—15 |

FOREIGN PATENTS

| | | |
|---|---|---|
| 818,251 | 7/49 | Germany. |
| 1,083,028 | 6/60 | Germany. |

SAMUEL F. COLEMAN, *Primary Examiner.*

ANDRES H. NIELSEN, *Examiner.*